(12) United States Patent
Cadena (10) Patent No.: US 9,429,181 B2
(45) Date of Patent: Aug. 30, 2016

(54) VEHICLE WHEEL LOCK ASSEMBLY

(71) Applicant: Nissan North America, Inc., Franklin, TN (US)

(72) Inventor: Manuel Alejandro Vite Cadena, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 161 days.

(21) Appl. No.: 14/448,478

(22) Filed: Jul. 31, 2014

(65) Prior Publication Data

US 2016/0032959 A1 Feb. 4, 2016

(51) Int. Cl.
    *F16B 37/04* (2006.01)
    *F16B 39/28* (2006.01)
    *F16B 41/00* (2006.01)

(52) U.S. Cl.
    CPC ............. *F16B 39/28* (2013.01); *F16B 41/005* (2013.01)

(58) Field of Classification Search
    CPC .... F16B 37/043; F16B 39/28; F16B 41/005; F16B 41/007
    USPC ......................................... 411/427, 429, 432
    See application file for complete search history.

(56) References Cited

U.S. PATENT DOCUMENTS

| | | | |
|---|---|---|---|
| 1,447,564 A | 3/1923 | Norlund et al. | |
| 3,073,206 A | 1/1963 | Rudolph | |
| 3,492,841 A | 2/1970 | Ipri | |
| 3,540,245 A | 11/1970 | Pope | |
| 3,821,975 A | 7/1974 | Haker | |
| 3,874,258 A | 4/1975 | Semola et al. | |
| 4,302,137 A | 11/1981 | Hart | |
| 4,324,516 A * | 4/1982 | Sain ...................... | F16B 41/005 411/5 |
| 4,521,146 A * | 6/1985 | Wharton ............... | F16B 41/005 411/1 |
| 4,645,397 A * | 2/1987 | Howe ................... | F16B 41/005 411/372.6 |
| 4,693,655 A | 9/1987 | Omori | |
| 4,726,723 A | 2/1988 | Bainbridge | |
| 4,742,702 A | 5/1988 | Swertz | |
| 5,037,260 A | 8/1991 | Rubin | |
| 5,752,794 A | 5/1998 | Krawczak | |
| 6,053,681 A * | 4/2000 | Mattershead ........... | F16B 39/00 411/14 |
| 6,318,942 B1 | 11/2001 | Wieczorek | |

(Continued)

FOREIGN PATENT DOCUMENTS

| | | |
|---|---|---|
| EP | 476158 A1 | 3/1992 |
| FR | 948413 A | 8/1949 |

OTHER PUBLICATIONS

Product literature for Gorilla Guard Wheel Lock.

(Continued)

*Primary Examiner* — Roberta Delisle
(74) *Attorney, Agent, or Firm* — Global IP Counselors, LLP (57) ABSTRACT

A vehicle wheel lock assembly includes a main body and a first sleeve. The main body has a wheel engaging end, a key portion, a first supporting section and a key receiving end. The key portion has a plurality of surface contours defining a first key pattern configured to couple with a tool for torsional movement of the main body. The first sleeve has an open end and a closed end. The open end is installed to the first supporting section of the main body such that the closed end of the first sleeve covers the key receiving end with the key portion exposed relative to the first sleeve. The first sleeve is retained by the first supporting section for rotation about the central axis of the main body and is non-movably retained relative to an axial direction of the main body.

18 Claims, 10 Drawing Sheets

(56) References Cited

U.S. PATENT DOCUMENTS

| | | | |
|---|---|---|---|
| 6,609,401 B1 | 8/2003 | Iskhakbayev | |
| 6,695,557 B2 * | 2/2004 | Hove | F16B 37/14 |
| | | | 292/307 B |
| 6,719,511 B2 | 4/2004 | Notaro et al. | |
| 6,910,355 B2 | 6/2005 | Swanson | |
| 7,392,674 B1 * | 7/2008 | Grote | F16B 37/14 |
| | | | 411/910 |
| 7,905,697 B2 * | 3/2011 | Ward, Jr. | F16B 23/0069 |
| | | | 411/373 |
| 7,938,610 B2 * | 5/2011 | Kishida | F16B 41/005 |
| | | | 411/429 |
| 8,366,367 B2 * | 2/2013 | Matlock | F16B 37/14 |
| | | | 411/372.6 |
| 8,739,585 B2 | 6/2014 | Sims | |
| 9,200,666 B1 * | 12/2015 | Cadena | F16B 41/005 |
| 2009/0067948 A1 * | 3/2009 | Chung | F16B 23/0061 |
| | | | 411/429 |

OTHER PUBLICATIONS

Product literature for the Original Gorilla Wheel Lock.
Product literature for McGard Wheel Lock.
Product literature for Torx Tamper-Resistant Fastener.

* cited by examiner

VEHICLE WHEEL LOCK ASSEMBLY

BACKGROUND

1. Field of the Invention

The present invention generally relates to a vehicle wheel lock assembly. More specifically, the present invention relates to a vehicle wheel lock assembly that includes a main body with a key portion and a rotatable sleeve fixed in an axial direction to the main body, the rotatable sleeve having a closed end covering the corresponding end of the main body.

2. Background Information

Wheel locks are typically used to prevent unauthorized removal of a wheel from a vehicle.

SUMMARY

One object of the present disclosure is to provide a wheel lock assembly with a main body and a rotatable sleeve that restricts access to a non-wheel contacting end of the main body with the wheel lock assembly installed to a vehicle.

Another object of the present disclosure is to provide a main body of a wheel lock assembly with a rotatable sleeve that completely covers a non-wheel contacting end of the main body thereby preventing tampering and unauthorized removal of the wheel lock assembly.

In view of the state of the known technology, one aspect of the disclosure is to provide a vehicle wheel lock assembly that includes a main body and a first sleeve. The main body has a wheel engaging end, a key portion, a first supporting section and a key receiving end opposite wheel engaging end. The wheel engaging end is configured to fixedly retain a wheel to a vehicle suspension component. The key portion has a plurality of surface contours defining a first key pattern configured to couple with a tool for torsional movement of the main body. The first sleeve has an open end and a closed end. The open end is installed to the first supporting section of the main body such that the closed end of the first sleeve covers the key receiving end with the key portion exposed relative to the first sleeve. The first sleeve is retained by the first supporting section for rotation about the central axis of the main body and is non-movably retained relative to an axial direction of the main body.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
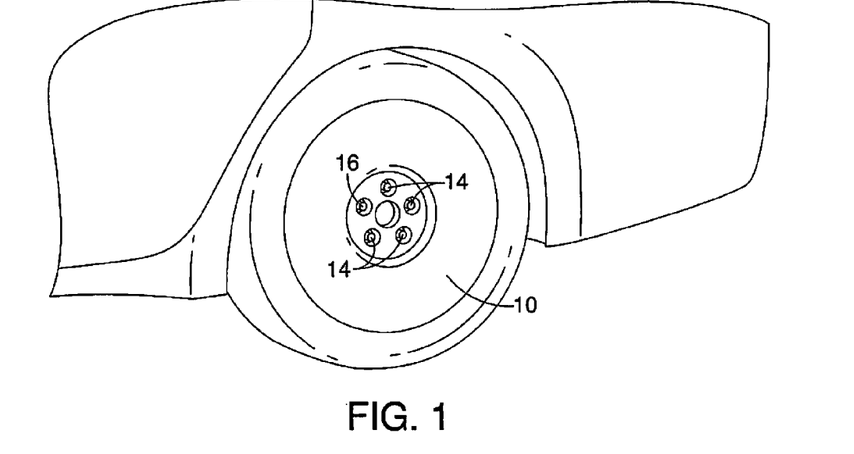
FIG. 1 is a perspective view of a wheel well area of a vehicle showing a wheel attached to the vehicle with lug nuts and a wheel lock assembly in accordance with a first embodiment.

Referring initially to FIG. 1, a wheel 10 attached to a vehicle 12 by lug nuts 14 and a wheel lock assembly 16 is illustrated in accordance with a first embodiment. The wheel lock assembly 16 includes structure that reduces the possibility of tampering and unauthorized removal. Specifically, the wheel lock assembly 16 includes structure that covers an outer end (a non-wheel contacting end or key receiving end) of the wheel lock structure 16 with a rotatable sleeve thereby limiting the possibility of tampering. The wheel locking assembly 16 is made of metallic materials and is described in greater detail below.

Figure 2:
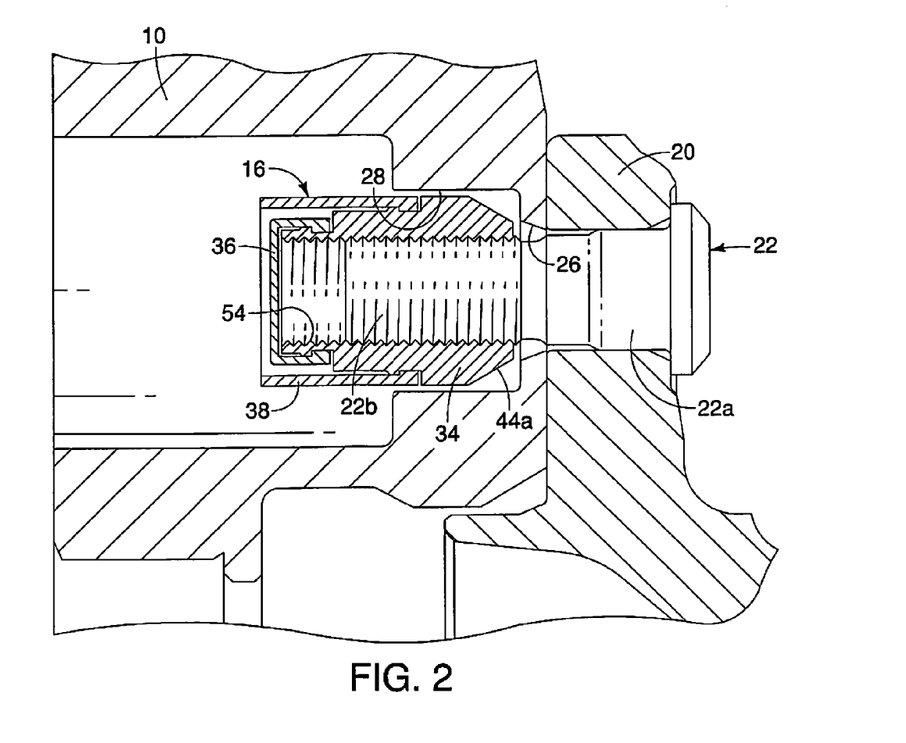
FIG. 2 is a cross-sectional view of a portion of the wheel showing a hub and one lug stud installed to the hub, the wheel and the wheel lock assembly retaining the wheel to the hub in accordance with the first embodiment.
Figure 3:
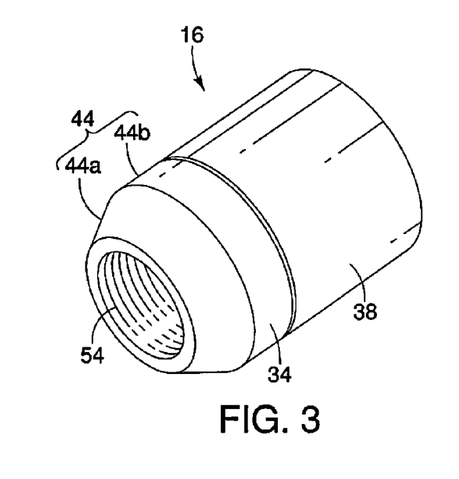
FIG. 3 is perspective view of the wheel lock assembly shown removed from the lug stud and wheel, showing a wheel engaging end of a main body and an outer sleeve in accordance with the first embodiment.
Figure 4:
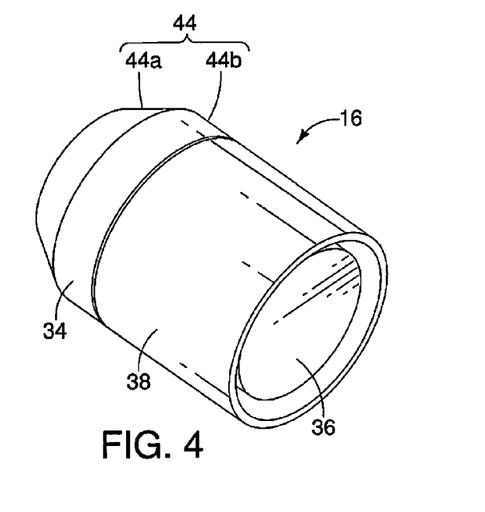
FIG. 4 is another perspective view of the wheel lock assembly showing the outer sleeve and an inner sleeve that conceals a key receiving end of the main body in accordance with the first embodiment.
Figure 5:
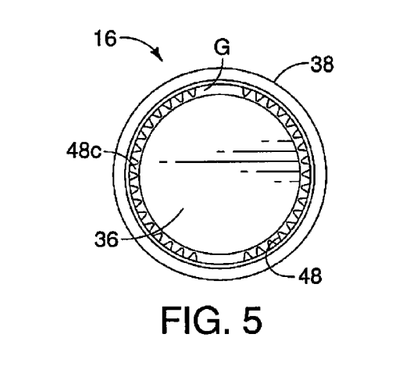
FIG. 5 is an end view of the wheel lock assembly showing the inner sleeve covering the key receiving end of the main body and showing a gap between the inner sleeve and the outer sleeve revealing a first key pattern on the main body, the gap being dimensioned to receive a key in accordance with the first embodiment.
Figure 6:
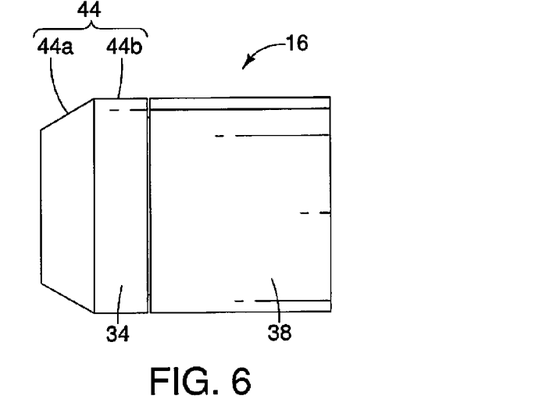
FIG. 6 is a side view of the wheel lock assembly showing the outer sleeve and the wheel engaging end of the main body in accordance with the first embodiment.

As shown in cross-section in FIG. 2, the vehicle 12 includes an axle hub 20 with a plurality of threaded studs 22 (only one stud 22 is depicted in FIG. 2). Each of the threaded studs 22 includes a fixing portion 22a and a threaded portion 22b. The fixing portion 22a extends through an opening in the axle hub 20 and is fixedly attached to the axle hub 20 via a press-fit engagement. Since axle hubs, threaded studs and press-fit engagements are conventional vehicle features, further description is omitted for the sake of brevity.

The wheel 10 is an annular shaped metallic structure with a rubber tire mounted thereto. The wheel 10 includes a central hub mounting portion formed with a plurality of mounting apertures 26 and a plurality of recesses 28 that are co-axially aligned with and provide access to respective ones of the mounting apertures 26. Since wheels and tires are conventional vehicle components, further description is omitted for the sake of brevity.

Figure 14:
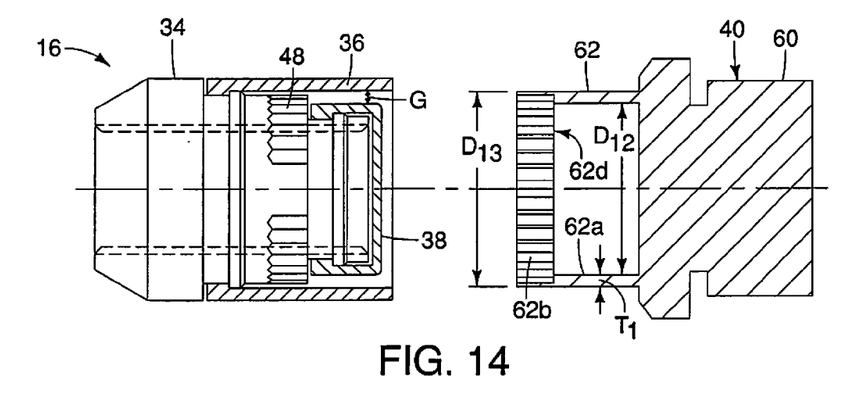
FIG. 14 is a side sectional view showing the wheel lock assembly and the key aligned prior to insertion of the key into the wheel lock assembly in accordance with the first embodiment.
Figure 15:
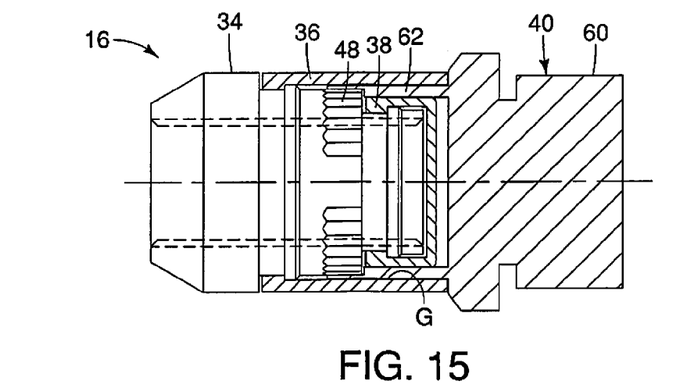
FIG. 15 is another side sectional view showing of the wheel lock assembly and the key with the key inserted into the wheel lock assembly such that the first key pattern and the second key pattern engage, mesh and mate such that the wheel lock assembly and the key rotate together as a single structure in accordance with the first embodiment.

A description is now provided of a first embodiment of the wheel lock assembly 16 with specific reference to FIGS. 2-15. The wheel lock assembly 16 basically includes a main body 34 (FIGS. 2-10 and 14-15), an inner sleeve 36 (FIGS. 2, 4-5, 7-8 and 11), an outer sleeve 38 (FIGS. 2-8 and 12) and a key 40 (FIGS. 7, 14 and 15).

Figure 7:
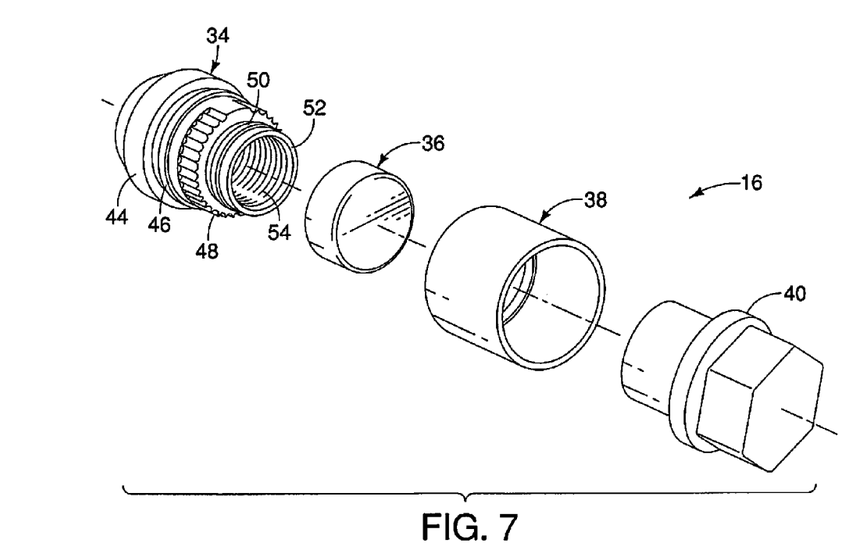
FIG. 7 is an exploded view of the wheel lock assembly showing the main body, the inner sleeve, the outer sleeve and the key in accordance with the first embodiment.
Figure 9:
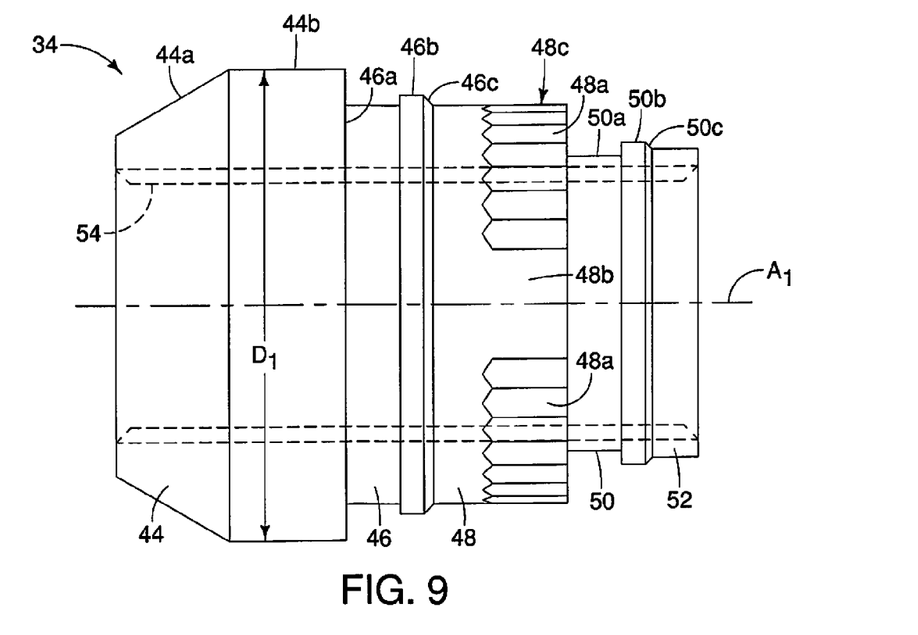
FIG. 9 is a side view of the main body removed from the wheel lock assembly, showing the wheel engaging end, an outer sleeve supporting section, a key portion with the first key pattern, an inner sleeve supporting section and a key receiving end in accordance with the first embodiment.
Figure 10:
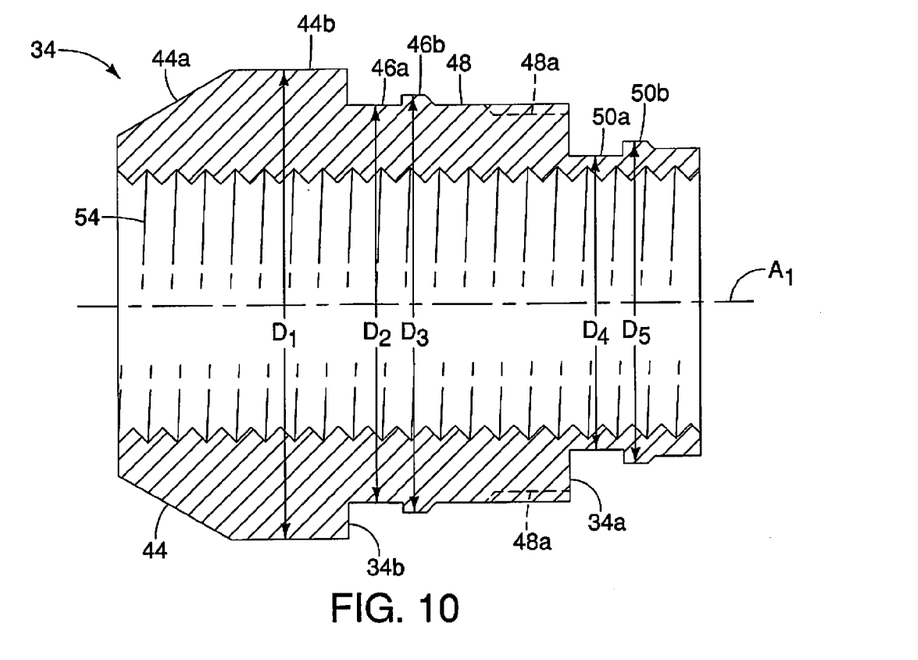
FIG. 10 is a cross-sectional view of the main body showing the wheel engaging end, an outer sleeve supporting section, a key portion with the first key pattern, an inner sleeve supporting section and a key receiving end in accordance with the first embodiment.

The main body 34 is shown separated from the remainder of the wheel lock assembly 16 in FIGS. 7, 9 and 10. The main body 34 defines a central axis $A_1$ that extends therethrough. The main body 34 is basically an annular shaped hollow member having a wheel engaging end 44, an outer sleeve supporting section 46, a key portion 48, an inner sleeve supporting section 50 and a key receiving end 52 opposite wheel engaging end 44. A threaded bore 54 extends through the main body 34 from the wheel engaging end 44 to the key receiving end 52.

In the depicted embodiment, the wheel engaging end 44 is configured to contact and fixedly retain the wheel 10 to the axle hub 20 (a vehicle suspension component). More specifically, the wheel engaging end 44 has a conical or tapering portion 44a and a cylindrical portion 44b. As shown in FIG. 9, an outer surface of the cylindrical portion 44b defines a first diameter $D_1$. When the wheel lock assembly 16 is installed to the vehicle 12, the threaded stud 22 is threaded into the threaded bore 54. As the wheel lock assembly 16 is tightened on the threaded stud 22, the tapering portion 44a of the wheel engaging end 44 contacts the surface of the wheel 10 within the recess 28 surrounding the aperture 26, as shown in FIG. 2.

The outer sleeve supporting section 46 is defined on the outer surface of the main body 34 between the cylindrical portion 44b of the wheel engaging end 44 and the key portion 48. The outer sleeve supporting section 46 includes a recessed annular surface 46a, an annular projection 46b and a ramp surface 46c. As indicated in FIG. 9, the recessed annular surface 46a has a second diameter $D_2$ and the annular projection 46b has a third diameter $D_3$ that is larger than the second diameter $D_2$. Both the second diameter $D_2$ and the third diameter $D_3$ are smaller than the first diameter $D_1$.

The key portion 48 includes a plurality of surface contours, such as, for example, surface contours 48a and 48b as shown in FIG. 9. In FIG. 9 only two differing sized surface contours 48a and 48b are identified. However, it should be understood from the drawings and the description herein that the key portion 48 can be provided with many differing sized and shaped surface contours. There can be a plurality of surface contours 48a and a plurality of surface contours 48b and a plurality of other surface contours (not shown) that together define a first key pattern 48c that is configured to couple with a tool for torsional movement of the main body 34. More specifically, the key 40 (described in greater detail below) is configured to engage the first key pattern 48c. The above mentioned tool (not shown) can be a wrench that engages the key 40 thereby providing a way to install and uninstall the wheel lock assembly 16. As indicated in FIGS. 9 and 10, the key portion 48 overall has an outer diameter that is approximately equal to the second diameter $D_2$. The surface contours 48a and 48b can be made with curved and planar surface that reduce the overall diameter of the key portion 48, as indicated in FIG. 10. It should be understood from the drawings and description herein that the first key pattern 48c can be defined by differing combinations and orderings of the surface contours 48a and 48b, in various combinations with other additional surface contours or in the absence of other additional surface contours.

The inner sleeve supporting section 50 includes a recessed annular surface 50a, an annular projection 50b and a ramp surface 50c. The recessed annular surface 50a has a fourth diameter $D_4$ and the annular projection 50b has a fifth diameter $D_5$. The fifth diameter $D_5$ is larger than the fourth diameter $D_4$. Further, the fifth diameter $D_5$ is smaller than the second diameter $D_2$. The ramp surface 50c of the inner sleeve supporting section 50 diminishes in diameter moving in an axial direction of the main body 34 from the annular projection 50b toward the key receiving end 52. It should be understood from the drawings and the description herein that the axial direction of the main body 34 is a direction relative to the main body 34 coaxial with or parallel to the central axis $A_1$. Hence, in a general sense, the overall diameter of the main body 34 decreases moving from the cylindrical portion 44b of the wheel engaging end 44 toward the key receiving end 52 in the axial direction.

The inner sleeve supporting section 50 is also referred to hereinbelow as a first supporting section and the outer sleeve supporting section 46 is also referred to hereinbelow as a second supporting section.

The key receiving end 52 (also referred to as a non-wheel contacting end or free end of the main body) is cylindrically shaped and has an outer diameter that is less than the fifth diameter $D_5$, and can be equal to or greater than the fourth diameter $D_4$.

In the depicted embodiment, the threaded bore 54 extends completely through the main body 34 from the wheel engaging end 44 to the key receiving end 52. However, it should be understood from the drawings and the description herein that the threaded bore 54 need only be open at the wheel engaging end 44 so that the threads of the threaded bore 54 can contact and engage threads on the stud 22. Hence, in an alternative embodiment, the key receiving end 52 of the main body 34 can be closed with the threaded bore 54 extending only part way through the main body 34.

Figure 11:
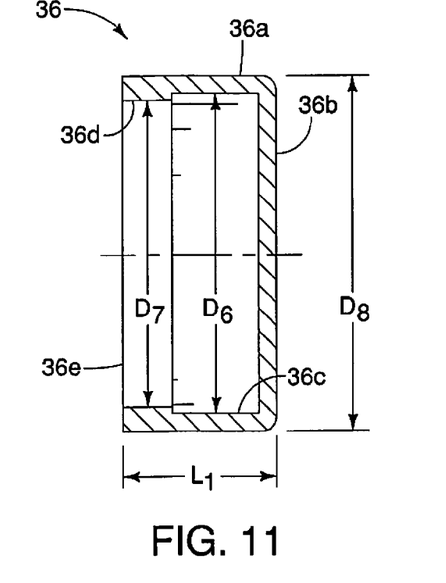
FIG. 11 is a cross-sectional view of the inner sleeve removed from the wheel lock assembly showing an open end, a closed end and an inner annular projection in accordance with the first embodiment.

The inner sleeve 36 (also referred to as a first sleeve) is shown removed from the remainder of the wheel lock assembly 16 in FIGS. 7 and 11. As shown in FIG. 11, the inner sleeve 36 is a hollow cap shaped member having an annular body portion 36a, an end cover or end cap portion 36b, an inner surface 36c, an inner annular projection 36d and an open end 36e. The inner surface 36c has a sixth diameter $D_6$ and the inner annular projection 36d has a seventh diameter $D_7$ that is smaller than the sixth diameter $D_6$. The seventh diameter $D_7$ is smaller than the fifth diameter $D_5$ of the annular projection 50b of the inner sleeve supporting portion 50 of the main body 34, but slightly larger than the fourth diameter $D_4$ of the recessed annular surface 50a. The sixth diameter $D_6$ is slightly larger than the fifth diameter $D_5$ of the annular projection 50b of the inner sleeve supporting portion 50 of the main body 34. The annular body portion 36a of the inner sleeve 36 further has a cylindrically shaped outer surface with an eighth diameter $D_8$. The eighth diameter $D_8$ is smaller than the second diameter $D_2$ of the recessed annular surface 46a and the key portion 48. Hence, once the inner sleeve 36 is installed to the main body 34, the outer diameter of the inner sleeve 36 is smaller that the outer diameter of the key portion 48, allowing the key 40 to contact and engage the key portion 48, as described below.

Figure 8:
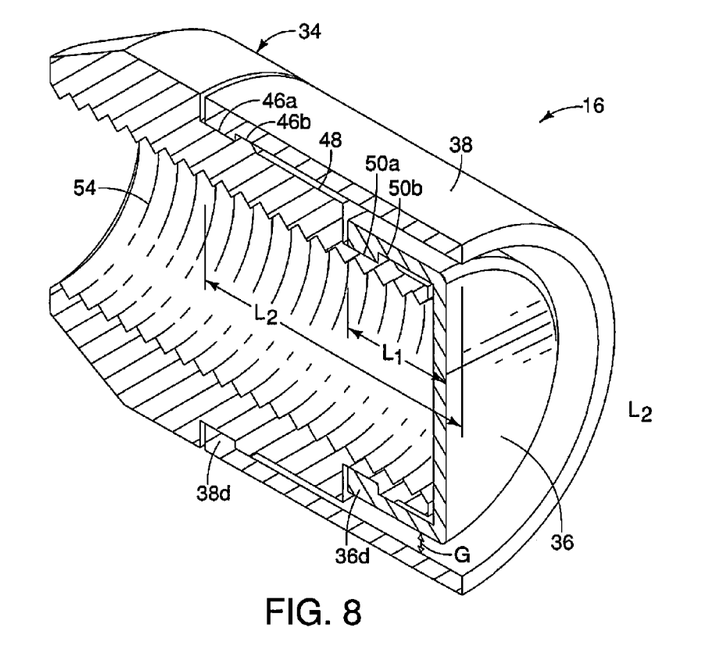
FIG. 8 is a cross-sectional perspective view of the wheel lock assembly showing the internal relationships between main body, the inner sleeve and the outer sleeve in accordance with the first embodiment.

As shown in FIGS. 8, 14 and 15, the end cap portion 36b (the closed end) of inner sleeve 36 covers the threaded bore 54 (the central bore) at the key receiving end 52 of the main body 34.

The inner sleeve 36 can be installed to the inner sleeve supporting section 50 by any of a variety of assembly methods. The inner sleeve 36 can be press-fitted on to the inner sleeve supporting section 50 with the ramp surface 50c providing a means for pressing moving between the outer annular projection 50b and the inner annular projection 36d during the installation process. Alternatively or in combination with the above method, the inner sleeve 36 can be heated such that its overall diameter increases allowing it to be more freely fitted on to the main body 34. After cooling, the diameter of the inner sleeve 36 diminishes. Once the inner annular projection 36d is forced past the outer annular projection 50b, the inner annular projection 36d is retained by the outer annular projection 50b such that the inner sleeve 36 is able to rotate about the main body 34, but is prevented from undergoing movement in an axial direction of the main body 34 by interference between the inner annular projection 36d, the outer annular projection 50b and the key portion 48. This interference is provided by the relative diameters of the adjacent surfaces of the main body 34.

Specifically as shown in FIG. 10, the main body 34 includes a first shoulder surface 34a and a second shoulder surface 34b that are both perpendicular to a central axis Al of the main body 34. The first shoulder surface 34a extends circumferentially around the main body 34 from the key portion 48 to the recessed annular surface 50a of the inner sleeve supporting section 50. Similarly, the second shoulder surface 34b extends circumferentially around the main body 34 from the cylindrical portion 44b of the wheel engaging end 44 to the recessed annular surface 46a of the outer sleeve supporting section 46. Once the inner sleeve 36 is installed to the inner sleeve supporting section 50, the open end 36e of the inner sleeve 36 faces the first shoulder surface 34a. Hence, the first shoulder surface 34a prevents movement of the inner sleeve 36 along the axis $A_1$ toward the wheel engaging end 44 of the main body 34. Since the fifth diameter $D_5$ of the annular projection 50b is greater than seventh diameter $D_7$ of the inner annular projection 36d, the annular projection 50b prevents movement of the inner sleeve 36 along the axis $A_1$ toward the key receiving end 52 of the main body 34. Therefore, axial movement of the inner sleeve 36 is prevented. However, the inner sleeve 36 freely rotates about the main body 34.

Figure 12:
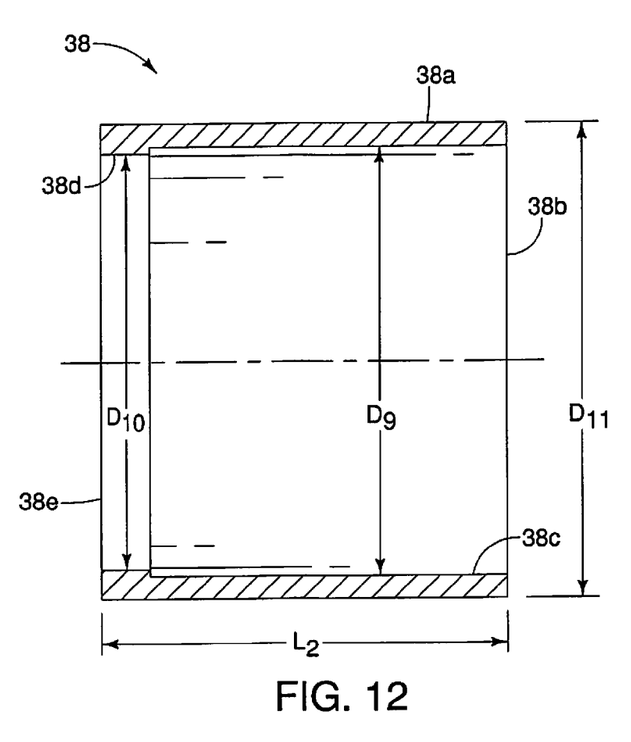
FIG. 12 is a cross-sectional view of the outer sleeve removed from the wheel lock assembly showing a first open end, a second open end and an inner annular projection in accordance with the first embodiment.
Figure 13:
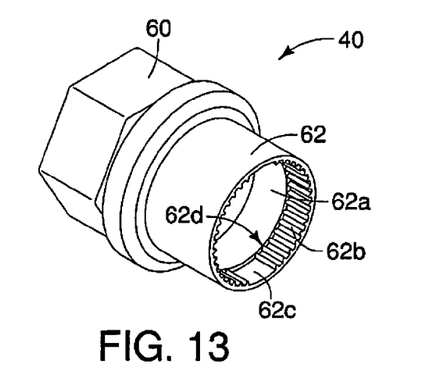
FIG. 13 is a perspective view of the key used to install and remove the wheel lock assembly from the vehicle, showing a second key pattern in accordance with the first embodiment.

The outer sleeve 38 (also referred to as a second sleeve) is shown removed from the remainder of the wheel lock assembly 16 in FIGS. 7 and 12. As shown in FIG. 12, the outer sleeve 38 is a hollow cylindrically shaped member having an annular body portion 38a with a first open end 38b, an inner surface 38c, an inner annular projection 38d and a second open end 38e. The inner surface 38c has a ninth diameter $D_9$ and the inner annular projection 38d has a tenth diameter $D_{10}$ that is smaller than the ninth diameter $D_9$. The tenth diameter $D_{10}$ is smaller than the third diameter $D_3$ of the annular projection 46b of the outer sleeve supporting portion 46 of the main body 34, but slightly larger than the second diameter $D_2$ of the recessed annular surface 46a. The ninth diameter $D_9$ is slightly larger than the third diameter $D_3$ of the annular projection 46b of the outer sleeve supporting portion 46 of the main body 34. The annular body portion 38a of the outer sleeve 38 further has a cylindrically shaped outer surface with an eleventh diameter $D_{11}$. The eleventh diameter $D_{11}$ is approximately equal to the first diameter $D_1$ of the cylindrical portion 44b of the wheel engaging end 44 of the main body 34, within a predetermined tolerance. Hence, the outer sleeve 38 has an outer diameter that is approximately equal to the outer diameter of the cylindrical portion 44b of the wheel engaging end 44 of the main body 34, as shown in FIGS. 2 and 14.

The outer sleeve 38 is installed to the outer sleeve supporting section 46 by any of a variety of assembly methods. For example, the outer sleeve 38 can be press-fitted on to the outer sleeve supporting section 46 with the ramp surface 46c providing a means for reducing interference between the outer annular projection 46b and the inner annular projection 38d during the installation process. Alternatively or in combination with, the outer sleeve 38 can be heated such that its overall diameter increases allowing it to more freely fit over the main body 34. After cooling, the diameter of the outer sleeve 38 diminishes. Once the inner annular projection 38d is forced past the outer annular projection 46b the inner annular projection 38d is retained by the outer annular projection 46b such that the outer sleeve 38 is able to rotate about the main body 34, but is prevented from undergoing movement in the axial direction of the main body 34 by interference between the inner annular projection 38d, the outer annular projection 46b and the cylindrical portion 44b of the wheel engaging end 44. This interference is provided by the relative diameters of the adjacent surfaces of the main body 34.

Once the outer sleeve 38 is installed to the outer sleeve supporting section 46, the second open end 38e of the outer sleeve 38 faces the second shoulder surface 34b. Hence, the second shoulder surface 34b prevents movement of the outer sleeve 38 along the axis $A_1$ toward the wheel engaging end 44 of the main body 34. Since the third diameter $D_3$ of the annular projection 46b is greater than tenth diameter $D_{10}$ of the inner annular projection 38d, the annular projection 46b prevents movement of the outer sleeve 38 in the axial direction (relative to the central axis $A_1$) toward the key receiving end 52 of the main body 34. Therefore, axial movement of the outer sleeve 38 is prevented. However, the outer sleeve 38 freely rotates about the main body 34 and the inner sleeve 36.

As shown in the drawings, the outer sleeve 38 encircles and covers an outer radial surface of the inner sleeve 36 defining a gap G therebetween. Further, as shown in FIG. 8, the inner sleeve 36 (the first sleeve) has a first length $L_1$ measured in the axial direction of the main body 34. The outer sleeve 38 (the second sleeve) has a second length $L_2$ measured in the axial direction of the main body 34. The second length $L_2$ is greater than the first length $L_1$.

The key 40 is shown in FIGS. 7, 13, 14 and 15. The key 40 has a tool receiving portion 60 and a sleeve portion 62. The tool receiving portion 60 is depicted as having a standard hexagonal set of surfaces that can be engaged with a lug wrench or other wrenches in order to install and remove the wheel lock assembly 16. However, it should be understood from the drawings and the description herein that the tool receiving portion 60 can include other tool receiving shapes. The sleeve portion 62 of the key 40 includes a hollow interior surface 62a having surface contours 62b and 62c that define a second key pattern 62d. The second key pattern 62d is shaped and dimensioned to engage and mate with the first key pattern 48c when the sleeve portion 62 of the key 40 is inserted over the inner sleeve 36, the key receiving end 52 and the key portion 48. Specifically, as shown in FIG. 14, the sleeve portion 62 has an inner surface having a twelfth diameter $D_{12}$ and an outer surface having a thirteenth diameter $D_{13}$. The diameter $D_{12}$ is slightly larger than the eighth diameter $D_8$ of the inner sleeve 36 and the diameter $D_{13}$ is slightly smaller than the ninth diameter $D_9$ of the outer sleeve 38.

As shown in FIG. 14, the gap G (a key receiving gap) is defined between the outer surface of the inner sleeve 36 and the inner surface of the outer sleeve 38. Hence, the gap G is approximately half the difference between the ninth diameter $D_9$ of the outer sleeve 38 minus the eighth diameter $D_8$ of the inner sleeve 36. In other words, the gap G is the distance between an inner surface of the outer sleeve 38 and the outer surface of the inner sleeve 36. The sleeve portion 62 of the key has an overall thickness $T_1$ that is slightly smaller than the gap G such that the sleeve portion 62 is easily inserted into the gap G, as shown in FIG. 15. Once inserted into the gap G within the wheel lock assembly 16, the second key pattern 62d contacts, meshes and engages the first key pattern 48c. With the key 40 installed to the wheel lock assembly 16 as shown in FIG. 15, a wrench or other torque enabling tool can be used to install and/or remove the wheel lock assembly 16 from the vehicle 12.

The configuration and design of the wheel lock assembly 16 provides a number of features. First, since the outer sleeve 38 rotates freely about the main body 34, it is difficult attempt to apply loosening torque to the wheel lock assembly 16. For example, if an unauthorized individual applies clamping pressure on the outer sleeve 38 in an attempt to remove the wheel lock assembly 16, the outer sleeve 38 rotates freely about the main body 34. If the outer sleeve 38 is somehow deformed and contacts the inner sleeve 36, then rotation of the outer sleeve 38 merely causes the inner sleeve 36 to rotate relative to the main body 34.

Second, if an unauthorized individual attempts to weld an extension on to the free end (the key receiving end 52) of the wheel lock assembly 16, the inner sleeve 36 thwarts such an endeavor. Specifically, the inner sleeve 36 includes the end cap portion 36b, which completely covers the key receiving end 52 of the main body 34 of the wheel lock assembly 16. If unauthorized welding activity results in a tool or tool receiving extension being welded to the inner sleeve 36, the tool receiving extension and the inner sleeve 36 then rotate freely about the main body 36 and the unauthorized activity is thwarted.

Third, since the wheel lock assembly 16 includes both the inner sleeve 36 and the outer sleeve 38, the first key pattern 48c is secluded and obscured. Specifically, the inner sleeve 36 covers the key receiving end 52 of the main body 34. The presence of the inner sleeve 36 requires that the first key pattern 48c be spaced apart from the key receiving end 52. Therefore, the first key pattern 48c is not easily accessed or tampered with. Further, the outer sleeve 38 covers the first key pattern 48c and the inner sleeve 36 further protecting the first key pattern 48c and preventing access there to. The sleeve portion 62 therefore is provided with a length corresponding to an axial length of the gap G. In other words, the sleeve portion 62 of the key 40 is of sufficient length such that when the sleeve portion 62 is inserted into the gap G between the inner sleeve 36 and the outer sleeve 38, second key pattern 62d of the sleeve portion 62 of the key 40 can contact and mate with the first key pattern 48c of the main body 34. More specifically, the key 40 includes a hollow interior surface within the sleeve portion 62 that includes the second key pattern 62d that mates with the first key pattern 48c when the key 40 is inserted over the first sleeve 36, the key receiving end 52 and the key portion 48 of the main body 34.

Second Embodiment

Figure 16:
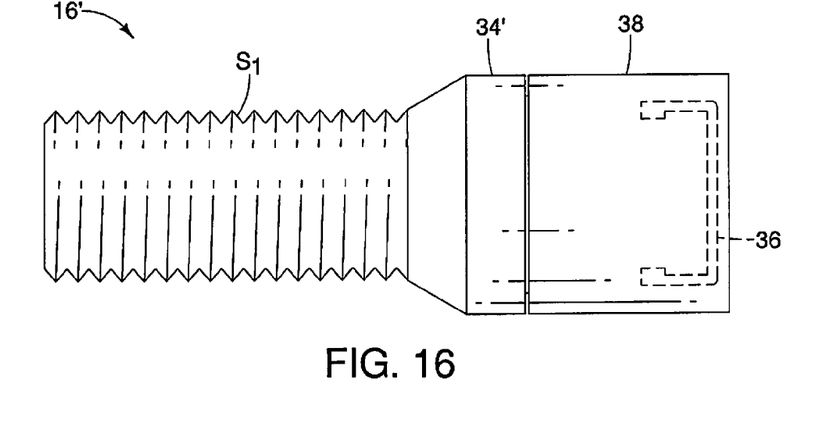
FIG. 16 is a side view of a wheel lock assembly in accordance with a second embodiment.

Referring now to FIG. 16, a wheel lock assembly 16' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the wheel lock assembly 16' includes a main body 34', the inner sleeve 36 and the outer sleeve 38. The inner sleeve 36 and the outer sleeve 38 are as described above in the first embodiment. The main body 34' includes all of the features of the main body 34 of the first embodiment, except that there is no threaded bore in the second embodiment. Rather, in the second embodiment, the central bore is replaced with a threaded shaft portion $S_1$. The threaded shaft portion $S_1$ is provided for those vehicles with wheel and hub configurations where there is no lug stud. Rather, the stud is part of a removable member with a threaded shaft, such as the threaded shaft portion $S_1$. More specifically, the threaded shaft portion $S_1$ of the main body 34' is a shaft portion having hub engaging threads.

Third Embodiment

Figure 17:
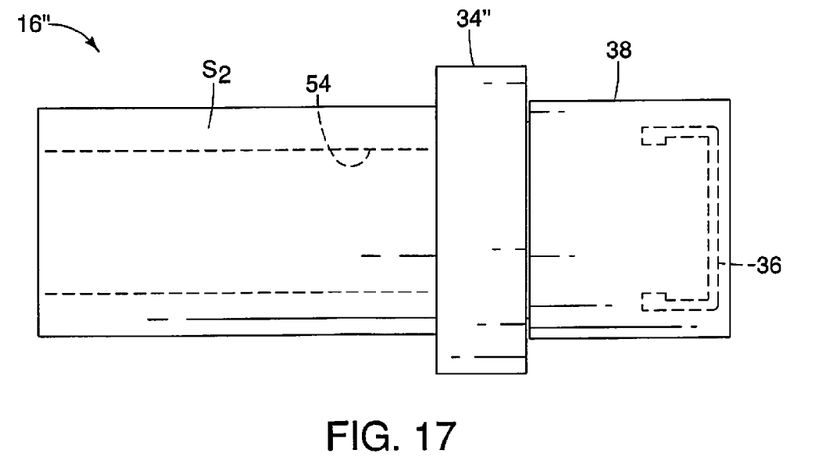
FIG. 17 is a side view of a wheel lock assembly in accordance with a third embodiment.

Referring now to FIG. 17, a wheel lock assembly 16" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, the wheel lock assembly 16" includes a main body 34", the inner sleeve 36 and the outer sleeve 38. The inner sleeve 36 and the outer sleeve 38 are as described above in the first embodiment. The main body 34" includes all of the features of the main body 34 of the first embodiment, except that the tapering portion is omitted from a wheel engaging end of the main body 34". Further, the main body " includes a hollow shaft section $S_2$ that extends the threaded bore 54. The shaft portion $S_2$ is provided for those vehicles with wheel configurations where the wheel has an oversized stud receiving aperture and the stud nut is required to have a shaft extension for proper retention of the wheel.

Fourth Embodiment

Figure 18:
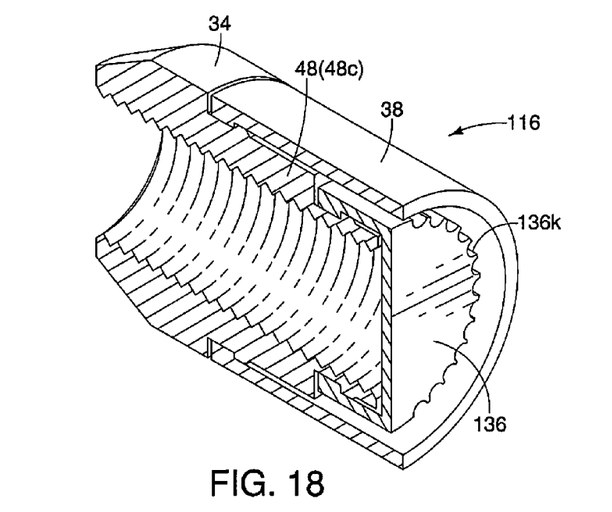
FIG. 18 is a cross-sectional perspective view of a wheel lock assembly showing a main body that includes a first key pattern, an outer sleeve and an inner sleeve, the inner sleeve having a third key pattern in accordance with a fourth embodiment.
Figure 19:
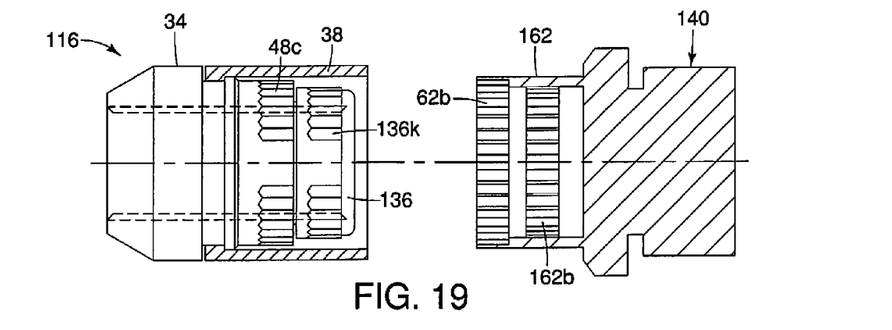
FIG. 19 is a side sectional view showing the wheel lock assembly and a key aligned prior to insertion of the key into the wheel lock assembly, the key having a second key pattern and a fourth key pattern in accordance with the fourth embodiment.
Figure 20:
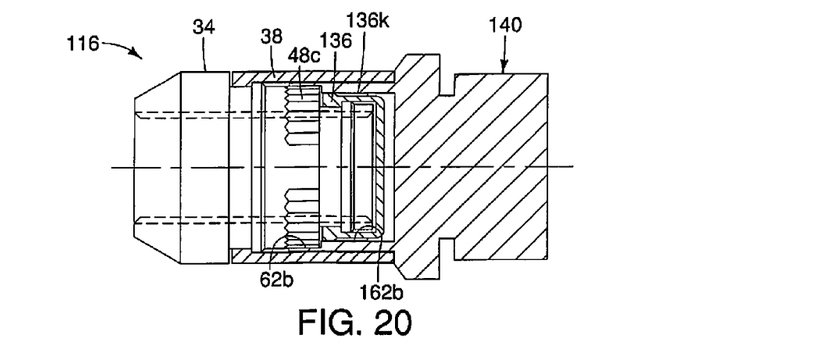
FIG. 20 is another side sectional view showing of the wheel lock assembly and the key with the key inserted into the wheel lock assembly such that the first key pattern and the second key pattern engage, mesh and mate, and the third key pattern and the fourth key pattern engage, mesh and mate such that the wheel lock assembly and the key rotate together as a single structure in accordance with the fourth embodiment.

Referring now to FIGS. 18-20, a wheel lock assembly 116 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the wheel lock assembly 116 includes many of the features of the wheel lock assembly 16 of the first embodiment. Specifically, the wheel lock assembly 116 includes the main body 34 and the outer sleeve 38, as described above with respect to the first embodiment. However, in the fourth embodiment, the inner sleeve 36 has been replaced with an inner sleeve 136. The inner sleeve 136 has all of the features of the inner sleeve 36 described above with respect to the first embodiment, but further includes a plurality of surface contours on an outer surface thereof that define a third key pattern 136k (a secondary key pattern).

Further, the key 40 of the first embodiment is replaced in the fourth embodiment with a key 140. The key 140 includes all of the features of the key 40 as described above with respect to the first embodiment, except that the inner surface of the sleeve portion 162 includes a fourth key pattern 162b, as shown in FIG. 19.

The third key pattern 136k of the inner sleeve 136 is configured to slidingly receive the second key pattern 62b upon insertion of the key 140 over the inner sleeve 140. The third key pattern 136k can be different but complimentary to the first key pattern 48c such that the second key pattern 62b mates with the third key pattern 136k when the key 140 is inserted over the inner sleeve 140. Upon further movement of the key 140 into the wheel lock assembly 116, the second 62b then mates with the first key pattern 48c while the fourth key pattern 162b mates with the third key pattern 136k.

Alternatively, the first key pattern 48c and the third key pattern 136k can be completely different, but have differing diameters, with the third key pattern 136k having an overall diameter that is smaller than the first key pattern 48c. The second key pattern 62b can then slip over the third key pattern 136k with no interference, while the fourth key pattern 162b can mate with the third key pattern 136k when the second key pattern 62b mates with the first key pattern 48c.

Fifth Embodiment

Figure 21:
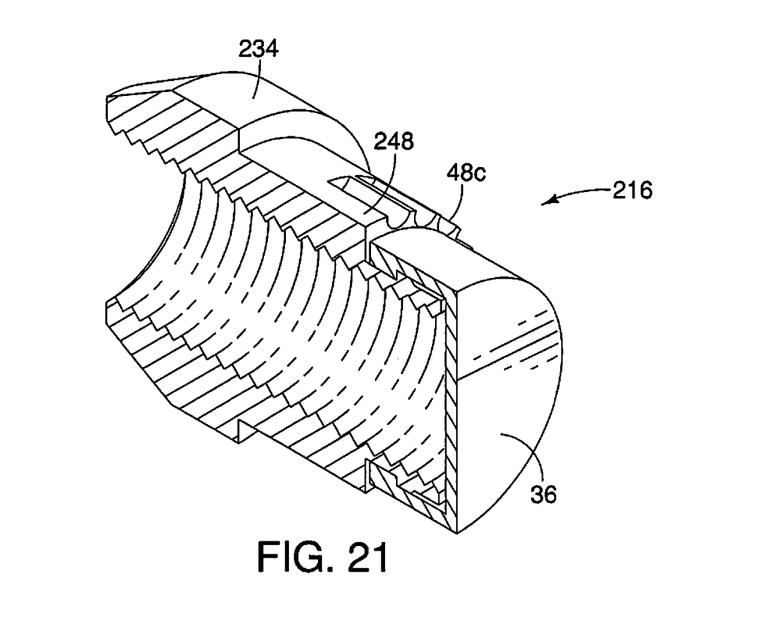
FIG. 21 is a cross-sectional perspective view of a wheel lock assembly showing a main body that includes a first key pattern and an inner sleeve in accordance with a fifth embodiment.
Figure 22:
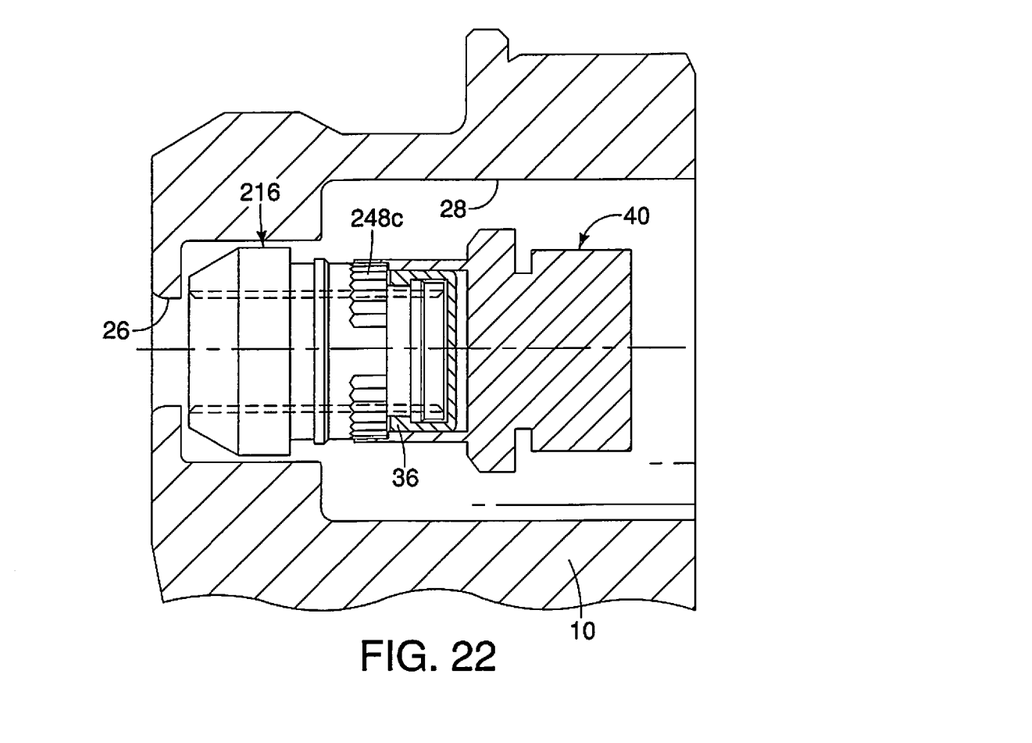
FIG. 22 is a side sectional view showing the wheel lock assembly and a key with the key inserted into the wheel lock assembly such that the first key pattern and a second key pattern within the key engage, mesh and mate such that the wheel lock assembly and the key rotate together as a single structure in accordance with the fifth embodiment.

Referring now to FIGS. 21-22, a wheel lock assembly 216 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the wheel lock assembly 216 includes a main body 234 that is similar to the main body 34 of the wheel lock assembly 16 of the first embodiment. Specifically, the main body 234 includes all of the features of the main body 34 of the first embodiment, except that in the fifth embodiment, the outer sleeve supporting section 46 is a smooth outer surface that basically serves as an extension of a key portion 248. The key portion 248 is identical to the key portion 48 of the first embodiment, except that the key portion 248 is longer in the axial direction of the main body 234. Further, the key portion 248 includes the first key pattern 48c.

In the fifth embodiment, the wheel lock assembly 216 includes the inner sleeve 36 as described above with respect to the first embodiment. However in the fifth embodiment, the outer sleeve 38 is completely omitted from the wheel lock assembly 216.

The key 40 of the first embodiment is employed in the fifth embodiment and includes the second key pattern 62b.

The wheel lock assembly 216 is a modification of the first embodiment that omits the outer sleeve 38. The wheel lock assembly 216 is well suited for the wheel 10 where the surfaces of the recess 28 have a relatively small diameter that limits access to the radially outward surfaces of the wheel lock assembly 216, thereby serving one of the purposes of an outer sleeve.

Sixth Embodiment

Figure 23:
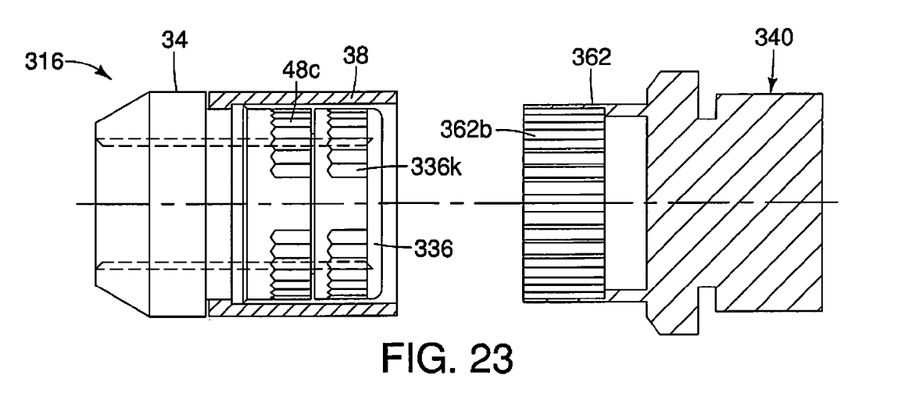
FIG. 23 is a side sectional view showing a wheel lock assembly and a key aligned prior to insertion of the key into the wheel lock assembly, the wheel lock assembly including a main body having a first key pattern, an inner sleeve having a secondary key pattern and the key having a second key pattern that mates with both the secondary key pattern and the first key pattern in accordance with a sixth embodiment.

Referring now to FIG. 23, a wheel lock assembly 316 and a key 340 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the wheel lock assembly 316 includes many of the features of the wheel lock assembly 16 of the first embodiment. Specifically, the wheel lock assembly 316 includes the main body 34 and the outer sleeve 38, as described above with respect to the first embodiment. However, in the sixth embodiment, the inner sleeve 36 has been replaced with an inner sleeve 336. The inner sleeve 336 has all of the features of the inner sleeve 36 described above with respect to the first embodiment, but further includes a plurality of surface contours on an outer surface thereof that define a third key pattern 336k (a secondary key pattern). The inner sleeve 336 has an outer diameter that is approximately equal to or slightly less than the outer diameter of the first key pattern 48c of the main body 34. Further, the third key pattern 336k is complimentary to the first key pattern 48c. More specifically, the third key pattern 336k and the first key pattern 48c can be identical. Therefore once positioned correctly (the inner sleeve 336 is rotatable), the third key pattern 336k and the first key pattern 48c align and can match perfectly. Alternatively, the third key pattern 336k can have many of the surface contours of the first key pattern 48c, but can be have one or more differing surface contours that are provided to complicate unauthorized activity.

The key 340 includes a single key pattern or second key pattern 362 that mates with both the third key pattern 336k (the secondary key pattern) and the first key pattern 48c. The second key pattern 362 extends in the axial direction throughout most of the inner surface of the key 340, as shown in FIG. 23.

Seventh Embodiment

Figure 24:
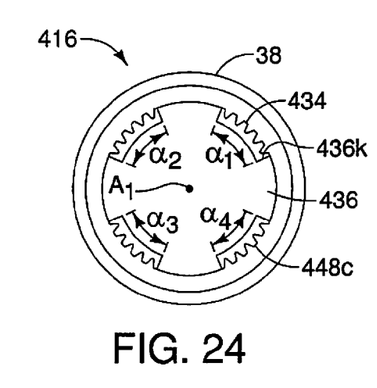
FIG. 24 is an end view of a wheel lock assembly having a main body with a first key pattern and an inner sleeve having a secondary key pattern in accordance with a seventh embodiment.
Figure 25:
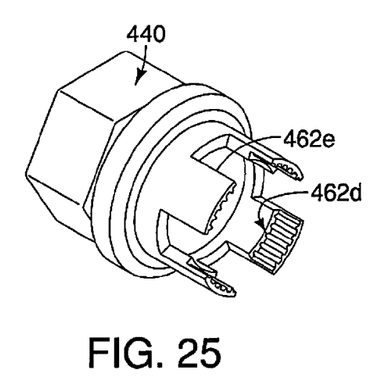
FIG. 25 is a perspective view of a key for the wheel lock assembly depicted in FIG. 24, the key having a second key pattern and a plurality of notches that are configured to mate with the secondary key pattern of the inner sleeve of the wheel lock assembly in accordance with the seventh embodiment.

Referring now to FIGS. 24-25, a wheel lock assembly 416 and a key 440 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The wheel lock assembly 416 includes a main body 434 that includes all of the features of the main body 34 of the first embodiment, except that the first key pattern 48c is replaced with a first key pattern 448c, as shown in FIG. 24. The wheel lock assembly 416 also includes the outer sleeve 38 (from the first embodiment) and an inner sleeve 436.

The inner sleeve 436 has all of the features of the inner sleeve 36 of the first embodiment, but additionally includes a first secondary key pattern 436k that is basically defined by a plurality of dimples, recesses or cutaway sections. Each dimple, recess or cutaway section has a circumferential length identified by angles $\alpha_1$, $\alpha_2$, $\alpha_3$ and $\alpha_4$. The angles $\alpha_1$, $\alpha_2$, $\alpha_3$ and $\alpha_4$ can be identical, or can differ from one another. Alternatively two or three of the angles $\alpha_1$, $\alpha_2$, $\alpha_3$ and $\alpha_4$ can be identical to one another, and one or two of the angles $\alpha_1$, $\alpha_2$, $\alpha_3$ and $\alpha_4$ can have differing arcuate lengths. The first key pattern 448c similarly can include the surface contours formed on sections of the main body 434 at locations corresponding to the dimples, recesses or cutaways. In FIG. 24, the first key pattern 448c is shown in alignment with the first secondary key pattern 436k. The hidden sections of the first key pattern 448c have an outer diameter that is the same as the outermost diameter of the inner sleeve 36.

The key 440 (shown in FIG. 25) used with the wheel lock assembly 416 includes a second key pattern 462d and a second secondary key pattern 462e. The second secondary key pattern 462e is defined by a plurality of notches or cutaway sections that are configured to mate with the first secondary key pattern 436k of the inner sleeve 436 of the wheel lock assembly 416. More specifically, the notches or cutaway sections that define the second secondary key pattern 462e are defined by surfaces of the key 440 that are spaced apart from one another by the angles $\alpha_1$, $\alpha_2$, $\alpha_3$ and $\alpha_4$ described above with respect to the first secondary key pattern 436k. Consequently, the second secondary key pattern 462e mates and meshes with the first secondary key pattern 436k of the inner sleeve 436. Further, when the inner sleeve 436 is rotated to the position depicted in FIG. 24, the second key pattern 462d of the key 440 can mate with and slide onto the first key pattern 448c.

The various features of the vehicle 10, such as the axle hub 20, the wheel 10 and other vehicle elements are conventional components that are well known in the art. Since these features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the wheel lock assembly. Accordingly, these terms, as utilized to describe the present invention should be interpreted relative to a vehicle equipped with the wheel lock assembly.

The term "configured" as used herein to describe a component, section or part of a device includes hardware that is constructed to carry out the desired function.

The terms of degree such as "slightly", "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle wheel lock assembly, comprising
a main body having a wheel engaging end, a key portion, a first supporting section and a key receiving end opposite wheel engaging end, the wheel engaging end being configured to fixedly retain a wheel to a vehicle suspension component, the key portion having a plurality of surface contours defining a first key pattern configured to couple with a tool for torsional movement of the main body;
a first sleeve having an open end and a closed end, the open end being installed to the first supporting section of the main body such that the closed end of the first sleeve covers the key receiving end with the key portion exposed relative to the first sleeve, the first sleeve being retained by the first supporting section for rotation about the central axis of the main body and being non-movably retained relative to an axial direction of the main body;
a key having a tool receiving portion and a sleeve portion including a hollow interior surface with a second key pattern that mates with the first key pattern when the key is inserted over the first sleeve, the key receiving end and the key portion; and
a second sleeve having an overall cylindrical shape that is open at each axial end thereof, and
the main body further comprises a second supporting portion located between the wheel engaging end and the key portion of the main body, the second sleeve being retained to the second supporting portion surrounding the key portion, the first supporting section and the first sleeve, such that the second sleeve is retained for rotation about the central axis of the main body and is non-movably retained relative to the axial direction of the main body, the second sleeve having an inner diameter that is greater than an outer diameter of the first sleeve and an outer diameter of the key portion such that the second sleeve and the first sleeve define a key receiving gap therebetween.

2. The vehicle wheel lock assembly according to claim 1, wherein the first sleeve includes a plurality of surface contours that define a third key pattern.

3. The vehicle wheel lock assembly according to claim 2, wherein
the third key pattern is configured to slidingly receive the second key pattern upon insertion of the key over the first sleeve such that the second key pattern mates with the third key pattern when the key is inserted over the first sleeve, the key receiving end and the key portion.

4. The vehicle wheel lock assembly according to claim 2, wherein
the plurality of surface contours defining the first key pattern differ from the plurality of surface contours defining the third key pattern, and
the key includes a fourth key pattern that mates with the third key pattern when the key is inserted over the first sleeve, the key receiving end and the key portion.

5. The vehicle wheel lock assembly according to claim 1, wherein
the first supporting section of the main body includes an outer annular projection formed on an outer surface thereof, the outer annular projection having an outer diameter, and
the first sleeve has hollow interior with an inner surface, the inner surface having an inner annular projection with an inner diameter that is smaller than the outer diameter of the outer annular projection such that interference between the inner annular projection and the outer annular projection retains the first sleeve to the main body.

6. The vehicle wheel lock assembly according to claim 1, wherein the first sleeve has a first length measured in the axial direction of the main body, and
the second sleeve has a second length measured in the axial direction of the main body, the second length being greater than the first length.

7. The vehicle wheel lock assembly according to claim 1, wherein the second sleeve has an attachment end retained to the second supporting portion of the main body and a free end that is aligned with the closed end of the first sleeve.

8. The vehicle wheel lock assembly according to claim 1, wherein the second supporting portion of the main body includes an annular projection formed on an outer surface thereof adjacent to the key portion, the annular projection having an outer diameter, and
the second sleeve has an inner surface including an inner annular projection with an inner diameter that is smaller than the outer diameter of the annular projection such that interference between the inner annular projection and the annular projection of the main body retains the second sleeve to the main body.

9. The vehicle wheel lock assembly according to claim 1, wherein
the main body includes a central bore extending therethrough open to the wheel engaging end and the key receiving end, the central bore having stud engaging threads thereon.

10. The vehicle wheel lock assembly according to claim 9, wherein
the closed end of first sleeve covers the central bore at the key receiving end of the main body.

11. The vehicle wheel lock assembly according to claim 1, wherein
the wheel engaging end includes a tapered surface.

12. The vehicle wheel lock assembly according to claim 1, wherein
the wheel engaging end includes a shaft portion having hub engaging threads.

13. The vehicle wheel lock assembly according to claim 12, wherein
the wheel engaging end has washer section with an outer diameter that is larger than the outer diameter of the key portion of the main body.

14. The vehicle wheel lock assembly according to claim 12, wherein
the wheel engaging end has an insertion portion having an outer diameter that is smaller than the outer diameter of the key portion of the main body.

15. The vehicle wheel lock assembly according to claim 1, wherein
the first sleeve has an outer diameter that is smaller than an outer diameter of the key portion of the main body.

16. The vehicle wheel lock assembly according to claim 1, wherein
the first sleeve includes a plurality of surface contours that define a secondary key pattern.

17. The vehicle wheel lock assembly according to claim 16, further comprising
a key having a tool receiving portion and a sleeve portion including a hollow interior surface with a second key pattern that mates with the first key pattern and the secondary key pattern of the first sleeve when the key is inserted over the first sleeve, the key receiving end and the key portion.

18. The vehicle wheel lock assembly according to claim 16, further comprising
a key having a tool receiving portion and a sleeve portion including a hollow interior surface with a second key pattern and a second secondary key pattern, the second key pattern mating with the first key pattern when the key is inserted over the first sleeve, the key receiving end and the key portion, and the second secondary key pattern mating with the secondary key pattern of the first sleeve.

* * * * *